United States Patent Office 2,827,418
Patented Mar. 18, 1958

2,827,418

THEOPHYLLINE DERIVATIVES AND THEIR PREPARATION

André Buzas, Vincennes, Claude Dufour, Puteaux, and Jean Roy, Paris, France, assignors to Frank E. Jonas, New York, N. Y.

No Drawing. Application January 18, 1955
Serial No. 482,668

Claims priority, application France February 6, 1954

8 Claims. (Cl. 167—65)

This invention relates to the preparation of new compounds derived from 7-β-hydroxyethyl theophylline by the substitution, at the hydrogen atom of the alcoholic group of this compund, of a residue of the type

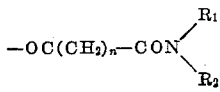

$R_1$ and $R_2$ being either hydrogen atoms or alkyl groups of from 1 to 5 carbon atoms, such as $CH_3$ or $C_2H_5$, the said radicals being additionally either identical or different.

The invention has for its principal object two methods of preparation of these substances as well as variants of these methods. These methods and variants are described hereinafter and are set forth as illustrative without in any way intending them as limitative.

To simplify the description, it will be considered in what follows that the di-acid utilized is succinic acid—that is to say, that $n=2$. It is for this very reason that succinic acid is exclusively used in the examples without any restrictive character as to the nature of the di-acids which it is possible to use.

The methods of the invention will be particularly described for the preparation of the succinate of 7-β-hydroxymethyl theophylline, a substance which has not hitherto been prepared.

According to a first method, this substance is obtained: by the action of succinic anhydride or succinyl monochloride on the 7-β-hydroxyethyl theophylline in the presence of a tertiary organic base, or an agent susceptible of neutralizing the acid appearing in the course of the reaction, this agent being, for example, calcium carbonate or sodium carbonate and the reaction being effected in a suitable solvent; or by reacting on a metallic salt of succinic acid a 7-halogeno-ethyl theophylline at a suitable temperature and in an appropriate solvent, such as benzene, toluene or alcohol; or by condensing, in the presence of a dehydrating agent, the 7-β-hydroxyethyl theophylline and succinic acid or a mono-ester of this latter, the said dehydrating agent being, for example, hydrochloric acid.

Whatever mode of operation may be selected from among those indicated above, there is obtained, after suitable purification, for example by crystallization in alcohol, the compound of the formula theophylline–$CH_2$–$CH_2$–O–CO–$CH_2$–$CH_2$–COOH or one of its salts or esters, a compound, which will hereinafter be called, "succinate of hydroxyethyl theophylline." Aside from its processes of preparation, the invention includes especially the compound itself, which has apparently not yet been obtained or described up to the present time, as well as its amides and mono-esters.

From this substance can be obtained the compounds which constitute the principal object of the present invention, namely, compounds which are designated here by the formula

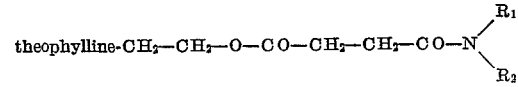

$R_1$ and $R_2$ having the meanings stated above.

It is sufficient for this to aminate, by one of the generally known procedures, the free acid group of the succinate of the hydroxymethyl theophylline. For this purpose there may, for example, and without any intent of indicating a limitation, be prepared the acid chloride of the succinate of hydroxyethyl theophylline and reaction of this latter caused to occur upon an amine of the general formula $NHR_1R_2$, in which $R_1$ and $R_2$ may be hydrogen atoms or the same or different alkyl radicals such as $CH_3$ or $C_2H_5$. To the same effect as stated, an ester of the succinate of hydroxyethyl theophylline may be used, which ester it is possible to prepare directly from hydroxyethyl theophylline, according to certain of the indicated variations. Direct reaction of the amine $NHR_1R_2$ on this ester can, therefore, be carried out without need for the presence of a solvent and pressure at a convenient temperature which gives rise to the formation of the desired compound.

According to a second method forming a part of the invention, β-hydroxyethyl theophylline is reacted upon a suitable derivative of the monoamide of succinic acid:

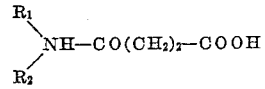

This derivative may be, for example, the acid chloride of the said compound, the reaction being effected in a suitable solvent and in the presence of a substance capable of fixing the acid liberated in the course of the reaction, this substance being, for example, a tertiary organic base or an alkali or alkaline earth carbonate.

A modification consists in causing a metallic salt:

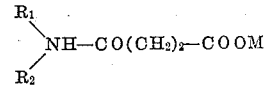

M designating a metal such as sodium or potassium, without limiting the invention to such, to react on a halogeno-ethyl theophylline in a manner to bring about condensation by elimination of the halogen salt of the metal M. The reaction is carried out in a suitable solvent which may be alcohol. The monoamide may also be caused to react on the β-hydroxyethyl theophylline in the presence of a suitable dehydrating agent.

Besides the three methods or processes which precede, the invention comprises still other arrangements which respond to the further disclosures given hereafter. As has already been stated for the preceding, these further indications are not intended to be of a limiting character.

In the carrying out of one or the other of the above methods or processes and their variants, the quantities of reactants are preferably calculated in such manner that the β-hydroxyethyl theophylline and the succinic acid or its derivatives are present at least approximately in molar proportions.

There is stated below a main example of carrying out each of the two principal procedures of the invention and also an indication of the variants for these examples.

*Example 1*

To a mixture of 1 molecular weight of 7-β-hydroxyethyl theophylline and 1 molecular weight of succinic anhydride in suspension in 500 cc. of benzene, 150 grams of pyridine are added and the mixture heated for 2 hours at 80° C. The solvent is subsequently removed. By the addition of a suitable solvent and acidification, the succinate of 7-β-hydroxyethyl theophylline crystallizes out. After drying in air, it is recrystallized from alcohol.

The compound thus obtained is in the form of a white crystallized powder having a fusion point of 163° C. and giving by analysis percentages of carbon, hydrogen and nitrogen very close to those calculated from the formula:

theophylline—$CH_2$—$CH_2$—O—CO$(CH_2)_2$—COOH

One molecular weight of this compound is dissolved in 500 cc. of chloroform and 1.1 molecular weights of thionyl chloride added. These are allowed to remain cold for some time and then afterwards heated under reflux until complete solution occurs. Upon concentration under vacuum, the acid chloride crystallizes out.

This chloride is put back into 500 cc. of chloroform or any other suitable solvent and there is added, preferably while maintaining the temperature at least about 25° C., an excess of the amine whose amide it is desired to obtain; for example, diethylamine. The chlorhydrate of the diethylamine precipitates. After a suitable reaction time, the latter is dried in air and concentrated under vacuum. By the addition of a suitable solvent, for example, a mixture of ether and ethyl acetate, the diethylamide of the succinate of β-hydroxyethyl theophylline crystallizes out. This is dried in air, washed and dried, preferably at a temperature of at least 50° C., finally under vacuum. The product thus prepared is in the form of a white crystallized powder soluble in water and melting at about 92–94° C.

This example is susceptible of diverse variations. Thus, in place of utilizing succinic anhydride, one may utilize the monochloride of succinic acid. One may also replace the pyridine by dimethylaniline or by any other tertiary base, and the benzene may be replaced by chloroform or toluene. Finally, the chloride of the succinate of 7-β-hydroxyethyl theophylline may be prepared with the aid of a chlorinating agent other than thionyl chloride, for example, by phosphorus pentachloride. Furthermore, bromine may be used instead of chlorine.

*Example 2*

To a mixture of 1 molecular weight of 7-β-hydroxyethyl theophylline and 200 grams of pyridine in 500 cc. of chloroform, 1 molecular weight of the acid chloride of the monodiethylamide of succinic acid is added. The temperature of the whole is raised to 60° C. for a suitable period and the solvent is removed under vacuum. The residue is taken up in a suitable solvent and the mixture neutralized with concentrated sulfuric acid. The diethylamide of the succinate of 7-β-hydroxyethyl theophylline crystallizes out. This is dried in air, washed and dried, as indicated above. The product prepared in this manner has the same properties as that prepared according to Example 1.

This example also is susceptible of being similarly varied as to the choice of solvents. The acid chloride of the diethylamide of succinic acid may also be replaced by another halogen, such as bromine.

The processes according to the invention notably permit obtaining the diethylamide of the succinate of β-hydroxyethyl theophylline. This substance, as has been pointed out, is in the form of a white crystalline powder, very soluble in water and melting at about 92° C.

As has already been stated, the invention is in no way limited to those of the modes of realization of its various natures which have been particularly explained. It embraces, on the contrary, all the variations.

The diethylamide has the formula

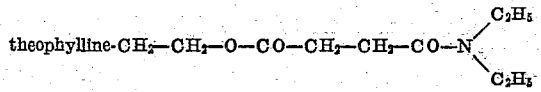

and is characterized by excellent respiratory and cardiovascular analeptic activity. It acts primarily as a stimulant. As a respiratory analeptic it improves pulmonary ventilation; as a cardiovascular analeptic it re-establishes normal contractions and rhythm of the heart, regularizes blood deficiency by altering the size of the vessels and restores arterial pressure to normal. For acute respiratory conditions, it is administered intravenously to the extent of 1–3 ampules per day and alternatively, or simultaneously, 1–3 ampules are administered intramuscularly. Each ampule contains 0.25 gram of active ingredient in sufficient distilled water to make 5 cc., in other words, a concentration of 5 centigrams per cubic centimeter. For the reanimation of the new-born, 0.5 to 1 cc. are administered intramuscularly. The new derivative may also be administered orally as compressed tablets containing 0.15 gram of active ingredient per tablet to the extent of 6 to 12 tablets (dragees) per day for respiratory conditions such as asthmatic crises or acute asthma and to the extent of 2 to 6 tablets per day for chronic asthmatic or hypertensive conditions. It may also be combined with phenobarbital in the proportions of 0.15 gram to 0.01 gram of phenobarbital per tablet for cardiovascular conditions, hypertension, cardiopathy, vascular spasms and coronary conditions.

We claim:

1. A theophylline derivative responding to the formula

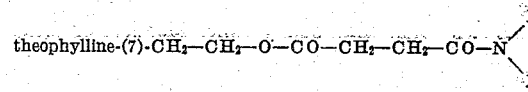

wherein $R_1$ and $R_2$ are selected from the group consisting of hydrogen and alkyl groups having from 1 to 2 carbon atoms.

2. A theophylline derivative having the formula

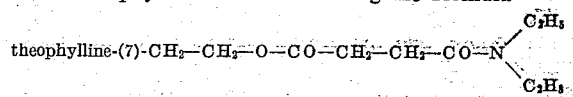

3. A theophylline derivative constituting an intermediate for the compound of claim 2 and having the formula theophylline-(7)-$CH_2$—$CH_2$—O—CO—$CH_2$—$CH_2$—COOH 4. A process for the preparation of the theophylline derivative of claim 3 which comprises reacting 7-β-hydroxyethyl theophylline and a compound selected from the group consisting of succinic anhydride and succinyl monochloride in the presence of an alkaline material selected from the group consisting of a tertiary organic base, calcium carbonate and sodium carbonate in a solvent.

5. A process for the preparation of a theophylline derivative defined by claim 1, which comprises reacting an ester of the succinate of hydroxyethyl theophylline with an amine $NHR_1R_2$, $R_1$ and $R_2$ being selected from the group consisting of hydrogen and alkyl groups having from 1 to 2 carbon atoms.

6. An injectable preparation containing approximately 0.25 gram of the compound of claim 2 in sufficient distilled water to make 5 cc.

7. A compressed tablet containing approximately 0.15 gram of the compound of claim 2.

8. A compressed tablet containing approximately 0.15 gram of the compound of claim 2, and approximately 0.01 gram of phenobarbital, in combination.

References Cited in the file of this patent

UNITED STATES PATENTS 2,715,125    Rice _____ Aug. 9, 1955

OTHER REFERENCES

Hildebrandt: Squibb Abstract Bulletin, vol. 25, No. 9, Feb. 27, 1952, p. A243.